United States Patent
Senarath et al.

(10) Patent No.: US 9,031,599 B2
(45) Date of Patent: May 12, 2015

(54) SYSTEM AND METHOD FOR POWER CONTROL

(75) Inventors: Gamini Senarath, Nepean (CA); Israfil Bahceci, Nepean (CA); Peiying Zhu, Ottawa (CA); Aaron Callard, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 484 days.

(21) Appl. No.: 12/633,657

(22) Filed: Dec. 8, 2009

(65) Prior Publication Data

US 2011/0136533 A1     Jun. 9, 2011

(51) Int. Cl.
*H04B 1/00*     (2006.01)
*H04B 7/00*     (2006.01)
(Continued)

(52) U.S. Cl.
CPC .......... *H04W 52/146* (2013.01); *H04W 52/241* (2013.01); *H04W 52/242* (2013.01);
(Continued)

(58) Field of Classification Search
CPC ............ H04W 36/08; H04W 36/0016; H04W 52/214; H04W 52/0245; H04W 84/12; H04W 52/02; H04W 52/04; H04W 52/24; H04W 52/34; H04W 52/50; H04W 52/52; H04W 52/216; H04W 52/262; H04W 52/286; H04W 52/343; H04W 52/365; H04W 52/367; H04W 12/06; H04W 12/12; H04W 88/02; H04W 88/06; H04W 88/08; H04B 7/04; H04B 7/024; H04B 7/043; H04B 7/0408; H04B 7/0413; H04B 7/0452; H04B 7/0456; H04B 7/0478; H04B 7/0482; H04B 7/0669; H04B 7/0697; H04B 7/18541; H04B 17/0077; H04L 1/0002; H04L 1/0003; H04L 1/1812; H04L 1/1822; H04L 27/2601; H04L 27/2647; H04N 7/17318; H04N 7/17309; H04N 7/17354

USPC ............... 455/67.14, 69, 127.1, 127.2, 412.1, 455/412.2, 418, 419.42, 423, 437, 442, 455/452.2, 502, 517, 522, 574, 67.13, 455/435.1, 450, 561; 370/280, 281, 311, 370/318, 320, 321, 328, 331, 332, 335, 337, 370/347, 448, 345

See application file for complete search history.

(56) References Cited

U.S. PATENT DOCUMENTS 6,351,461 B1    2/2002  Sakoda et al.
6,788,687 B2    9/2004  Bao et al.
(Continued)

FOREIGN PATENT DOCUMENTS

CN    1344445 A     4/2002
CN    1545217       11/2004
(Continued)

OTHER PUBLICATIONS

"3$^{rd}$ Generation Partnership Project; LTE; Evolved Universal Terrestrial Radio Access (E-UTRA); Physical layer procedures," Technical Specification 136.213, Feb. 2009, pp. 1-75, vol. 8.5.0.

(Continued)

*Primary Examiner* — Yuwen Pan
*Assistant Examiner* — Paul P Tran
(74) *Attorney, Agent, or Firm* — Slater & Matsil, L.L.P.

(57) ABSTRACT

A method of operating base station includes determining a first transmit power of a user equipment (UE), which includes determining a serving base station receive power, determining a path loss of the UE to the base station, determining a downlink signal to noise and interference ratio (SNIR) at the UE, and forming the first UE transmit power. Forming the first UE transmit power comprises summing the serving base station receive power, the path loss of the UE to the base station and the downlink SNIR. The method further includes instructing the UE to transmit at the first UE transmit power.

29 Claims, 7 Drawing Sheets

(51) Int. Cl.

| | | |
|---|---|---|
| *H01Q 11/12* | (2006.01) | |
| *H04B 1/04* | (2006.01) | |
| *H04W 72/00* | (2009.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04W 4/00* | (2009.01) | |
| *H04B 7/216* | (2006.01) | |
| *H04B 7/212* | (2006.01) | |
| *H04K 1/02* | (2006.01) | |
| *H04L 25/03* | (2006.01) | |
| *H04L 25/49* | (2006.01) | |
| *H04W 52/14* | (2009.01) | |
| *H04W 52/24* | (2009.01) | |
| *H04W 52/36* | (2009.01) | |

(52) U.S. Cl.
CPC .......... *H04W52/244* (2013.01); *H04W 52/245* (2013.01); *H04W 52/247* (2013.01); *H04W 52/248* (2013.01); *H04W 52/36* (2013.01)

(56) References Cited

U.S. PATENT DOCUMENTS

| | | | |
|---|---|---|---|
| 7,103,350 | B2 | 9/2006 | Au et al. |
| 7,412,254 | B2 | 8/2008 | Senarath et al. |
| 7,609,661 | B2 | 10/2009 | Chae et al. |
| 7,733,977 | B2 | 6/2010 | Kuri et al. |
| 8,116,805 | B2 | 2/2012 | Das et al. |
| 8,160,602 | B2 | 4/2012 | Wu et al. |
| 8,311,055 | B2 | 11/2012 | Senarath et al. |
| 2004/0141483 | A1* | 7/2004 | Zeira et al. ............ 370/335 |
| 2005/0220176 | A1 | 10/2005 | Zeira et al. |
| 2006/0094363 | A1* | 5/2006 | Kang et al. ............ 455/63.1 |
| 2006/0094372 | A1* | 5/2006 | Ahn et al. ............ 455/67.13 |
| 2006/0209767 | A1* | 9/2006 | Chae et al. ............ 370/335 |
| 2007/0189234 | A1* | 8/2007 | Heo et al. ............ 370/335 |
| 2007/0254652 | A1 | 11/2007 | Khan et al. |
| 2008/0069028 | A1* | 3/2008 | Richardson ............ 370/328 |
| 2008/0096568 | A1* | 4/2008 | Jeong ............ 455/441 |
| 2008/0130527 | A1* | 6/2008 | Huh et al. ............ 370/280 |
| 2008/0146154 | A1* | 6/2008 | Claussen et al. ............ 455/63.1 |
| 2008/0166976 | A1 | 7/2008 | Rao |
| 2008/0232332 | A1 | 9/2008 | Kaminski et al. |
| 2008/0280638 | A1 | 11/2008 | Malladi et al. |
| 2009/0125363 | A1 | 5/2009 | Frederiksen et al. |
| 2009/0196192 | A1* | 8/2009 | Lim et al. ............ 370/252 |
| 2009/0258665 | A1* | 10/2009 | Bourlas et al. ............ 455/522 |
| 2009/0285160 | A1 | 11/2009 | Cheng et al. |
| 2010/0027688 | A1 | 2/2010 | Suh et al. |
| 2010/0128687 | A1 | 5/2010 | Oteri et al. |
| 2010/0173638 | A1 | 7/2010 | Aiba et al. |
| 2010/0189080 | A1 | 7/2010 | Hu et al. |
| 2010/0210295 | A1* | 8/2010 | Koc et al. ............ 455/522 |
| 2010/0304776 | A1 | 12/2010 | Wu et al. |
| 2011/0039569 | A1* | 2/2011 | Narasimha et al. ......... 455/452.2 |
| 2011/0039589 | A1* | 2/2011 | Skov ............ 455/501 |
| 2011/0103287 | A1 | 5/2011 | Ma et al. |
| 2011/0111766 | A1* | 5/2011 | Yang et al. ............ 455/452.2 |
| 2011/0136533 | A1 | 6/2011 | Senarath et al. |
| 2011/0177821 | A1 | 7/2011 | Senarath et al. |
| 2011/0310879 | A1 | 12/2011 | Wu et al. |
| 2012/0252524 | A1* | 10/2012 | Gora et al. ............ 455/522 |
| 2012/0270582 | A1 | 10/2012 | Mese et al. |
| 2013/0188576 | A1 | 7/2013 | Chao et al. |

FOREIGN PATENT DOCUMENTS

| | | |
|---|---|---|
| CN | 101272172 | 9/2008 |
| CN | 101272388 | 9/2008 |
| CN | 101305538 | 11/2008 |
| CN | 101370240 | 2/2009 |
| CN | 101371459 A | 2/2009 |
| CN | 101378299 | 3/2009 |
| CN | 101399572 | 4/2009 |
| CN | 101584129 A | 11/2009 |
| CN | 101626260 | 1/2010 |
| EP | 1811686 A2 | 7/2007 |
| EP | 2056614 A1 | 6/2009 |
| EP | 2510729 A1 | 10/2012 |
| JP | 2008072722 | 3/2008 |
| JP | 2008533923 A | 8/2008 |
| JP | 2009523358 A | 6/2009 |
| WO | 0057576 A1 | 9/2000 |
| WO | WO2008/073013 | 6/2008 |
| WO | WO2008/076940 | 6/2008 |
| WO | 2008107930 A1 | 9/2008 |
| WO | WO2009/100567 | 8/2009 |
| WO | WO2009/138841 | 11/2009 |

OTHER PUBLICATIONS

"$3^{rd}$ Generation Partnership Project, Evolved Universal Terrestrial Radio Access (E-UTRA); Medium Access Control (MAC) protocol specification," Techincal Specification 136.321, Jan. 2009, pp. 1-44, vol. 8.4.0.

Jalali, A., et al., "Data Throughput of CDMA-HDR a High Efficiency-High Data Rate Personal Communication Wireless System," IEEE $51^{st}$ Vehicular Technology Conference Proceedings, 2000, pp. 1854-1858, vol. 3.

Myung, H. G., et al. "Single Carrier FDMA for Uplink Wireless Transmission," IEEE Vehicular Technology Magazine, Sep. 2006, pp. 30-38.

Dahlman, E., et al. "Key Features of the LTE Radio Interface," Ericsson Review No. 2, 2008, pp. 77-80.

"$3^{rd}$ Generation Partnership Project; Technical Specification 36.213 Group Radio Access Network; Evolved Universal Terrestrial Radio Access (E-UTRA); Physical Layer Procedures, Release 8," Technical Spicification, 3GPP TS 36.213, vol. 8.6.0, Mar. 2009, pp. 1-77.

PCT International Search Report and Written Opinion, PCT/CN2011/070890, Huawei Technologies Co., Ltd. et al., mailed May 19, 2011; 9 pages.

Written Opinion of the International Searching Authority, PCT/CN2011/070409, Huawei Technologies Co. Ltd. et al., mailed Apr. 12, 2011, 4 pages.

Notification of Transmittal of the International Search Report and the Written Opinion of the International Searching Authority or the Declaration, PCT/CN2011/070409, Huawei Technologies, Co. Ltd., et al., mailing date Apr. 21, 2011, 3 pages.

PCT International Search Report, PCT/CN2011/070409, Huawei Technologies Co., Ltd. et al., mailed Apr. 12, 2011, 3 pages.

PCT International Search Report, PCT/CN2010/079496, Huawei Technologies, Co., Ltd. et al., mailed Mar. 17, 2011, 11 pages.

Senarah, G. et al., "Power Control and ICIC for Uplink in LTE," Huawei Technologies, Co., Ltd., Aug. 14, 2009, 8 pages.

Yates, R. et al., "Integrated Power Control and Base Station Assignment," IEEE Transactions on Vehicular Technology, vol. 44, No. 3, Aug. 1995, pp. 638-644.

Xiao, W. et al., "Uplink Power Control, Interference Coordination and Resource Allocation for 3GPP E-UTRA," IEEE Vehicular Technology Conference, Sep. 2006, 5 pages.

Gjendemsjo, A. et al., "Binary Power Control for Sum Rate Maximization over Multiple Interfering Links," IEEE Transactions on Wireless Communications, vol. 7, No. 8, Aug. 2008, pp. 3164-3173.

Hande, P. et al., "Distributed Uplink Power Control for Optimal SIR Assignment in Cellular Data Networks," IEEE Communications Society, Proceedings IEEE Infocom, 2006, 13 pages.

Yates, R. "A Framework for Uplink Power Control in Cellular Radio Systems," IEEE Journal on Selected Areas in Communications, vol. 13, No. 7, Sep. 1995, pp. 1341-1347.

(56) References Cited

OTHER PUBLICATIONS

Zander, J. "Performance of Optimum Transmitter Power Control in Cellular Radio System," IEEE Transactions on Vehicular Technology, vol. 41, No. 1, Feb. 1992, pp. 57-62.

Halpern, S. W., "Reuse Partitioning in Cellular Systems," Proceedings of 33rd IEEE Vehicular Technology Conference, vol. 33, May 1983, pp. 322-327.

Foschini, G. J. et al., "A Simple Distributed Autonomous Power Control Algorithm and its Convergence," IEEE Transactions on Vehicular Technology, vol. 42, No. 4, Nov. 1993, pp. 641-646.

3GPP Lte ETSI, ETSI TS 136 213, V8.8.0, "Evolved Universal Terrestial Radio Access (E-UTRA): Physical layer procedures (3GPP TS 36.213 Release 8)," Oct. 2009, 79 pages.

Knopp, R. "Information Capacity and Power Control in Single-Cell Multiuser Communications," Proceedings of IEEE International Conference on Communications, vol. 1, 1995, pp. 331-335.

Senarath, G. et al., "Multi-hop Relay System Evaluation Methodology (Channel Model and Performance Metric)," IEEE 802.16 Broadband Wireless Access Working Group, http://ieee802.org/16>, Feb. 2007, 1 page.

Notification of Transmittal of the International Search Report and the Written Opinion of the International Searching Authority, or the Declaration, Huawei Technologies Co., Ltd., et al., PCT/CN/2010/079496 mailed Mar. 17, 2011, 11 pages.

Extended European Search Report and Supplementary European Search Report received in European Application No. 10835481, mailed Dec. 13, 2012, 9 pages.

Kim, D., et al., "Proposed Modification on Power Control Section (AWD-15.3.9.4)," IEEE 802.16 Broadband Wireless Access Working Group, IEEE C802.16m-09/ 1524r1, Jul. 6, 2009, 6 pages.

Extended European Search Report from European Patent Application No. 11734371.5-2412/2471327, PCT/CN2011/070409 mailed Jun. 6, 2012, 9 pages.

Muller, Andreas, "Cooperative Interference Prediction for Enhanced Link Adaptation in the 3GPP LTE Uplink," IEEE, 2010, 6 pages.

"3rd Generation Partnership Project; Technical Specification Group Radio Access Network; Evolved Universal Terrestrial Radio Access (E-UTRA); Physical layer procedures (Release 8)," 3GPP TS 36.213 V8.8.0, Sep. 2009, 77 pages.

CHTTL, "Further Simulation Results of User Grouping Methods for Downlink Inter-cell interference coordination," R1-083104, 3GPP TSG-RAN WG1 #54, Jeju, Korea, Aug. 18-22, 2008, 6 pages.

International Search Report and Written Opinion received in International Application No. PCT/US13/22143 mailed Mar. 29, 2013, 8 pages.

Notice of Reasons for Rejection received in Japanese Application No. 2012-542348 mailed Oct. 29, 2013, 4 pages.

First Chinese Office Action received in Chinese Application No. 201080055385.1 mailed Oct. 13, 2014, 6 pages.

International Search Report received in Chinese Application No. 201080055385.1, mailed Sep. 22, 2014, 2 pages.

\* cited by examiner

| | |
|---|---|
| Number of antennas | 2 eNB and 1 UE antennas |
| BS antenna height | 32m |
| UE antenna height | 1.7m |
| Thermal Noise density | -174 dBm/Hz |
| Channel model | ITU-A with 3 km/h or AWGN |
| UE power | 24 dBm |
| Penetration Loss | (with fast fading) |
| Pathloss | 128.2 + 36.7*log(distance[km]) |
| Shadow correlation | 0.5 between eNBs - 1 between sectors |
| Shadow variation | 8 dB |
| Cell-size | 500m |
| Scheduler | Proportional Fairness - FSS |
| Power control | P_0_cell + P_0_UE + alpha * PL |
| HARQ | Synchronous Adaptive IR |
| Number of transmissions | 4 |
| Bandwidth | 10 Mhz - 50 RBs |
| Number of RB for UL CCH | 2 |
| Antenna pattern | 2D with 3 dB at 70 degrees |
| Number of Ues | 24/sector |
| Deployment | 19 cells/3 sector - wraparound |
| BS noise figure | 5 dB |
| Minimum distance to eNB | 35m |
| Service | Full-buffer |
| MCS levels | QPSK, 16 QAM, 64 QAM |
| Link2System | EESM |
| Channel estimation | Ideal |
| BS antenna gain | 15 dB |
| BS noise figure | 5 dB |
| UE antenna gain | 0 dB |
| Sounding | 10 TTI |

Figure 6

SYSTEM AND METHOD FOR POWER CONTROL

TECHNICAL FIELD

The present invention relates generally to wireless communication systems, and more particularly to a system and method for power control.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

An illustration of a conventional mobile broadband system 100 is illustrated in FIG. 1. Mobile broadband system is divided into cells 108, 110 and 112, where each cell 108, 110 and 112 has corresponding base station 102, 104 and 106. Mobile terminals or user equipment (UE) 116 and 114 access network 100 through one of base stations 102, 104 and 106. Three base stations 108, 110 and 112 and two UEs 114 and 116 are used for simplicity of illustration, however, multiple cells and UEs can be used and provided for in real systems.

In communication systems such as CDMA and LTE, bandwidth is shared among terminal devices or UEs in the uplink communications channel. Because bandwidth is shared, power control is used in the uplink communications to address the near-far effect. This means that UE 114 at the cell edge with higher path loss PL2 to base station 102 will generally transmit with a higher power than UE 116 with lower path loss PL1 so that each respective transmission is received at a reasonable level above noise and interference.

The prior art has addressed the power control in a couple of ways. Under the full power control (FPC) scheme, the received signal level of all UEs are about the same at the base station in order to provide equal signal to noise and interference ratio (SNIR) for all users. Under FPC, the UE power is set to fully compensate for the channel loss, thus all users have same received signal level $P_o$ at the base station:

$$P_0 = \{10^* \log 10(N+I_0) + \text{SNIR}_{TARG}\}, \quad (1)$$

where, $I_0$ is the estimated total interference power at the base station, N is the thermal noise power, and $\text{SNIR}_{TARG}$ is the target SNIR. The transmit power at the UE under FPC is given by:

$$P_f = \{P_{max}, P_0 + \text{PL}\}, \quad (2)$$

Where $P_{max}$ is a maximum transmit power a UE is allowed to transmit and PL is the path loss. It can be seen that using FPC, all UEs have the same SNIR if the target SNIR is the same for all UEs and if UE power is not limited by $P_{max}$. When FPC is used, however, the same modulation and coding scheme (MCS) level is typically used by all the UEs, which potentially results in a reduced system throughput because higher MCS levels are not used.

The fractional power control (FrPC) scheme proposed in the LTE standard allows users with lower path loss to use a higher power level than would be otherwise required to maintain a minimum SNIR threshold. The allowed margin above the cell edge SNIR is inversely proportional to the path loss of the user, so that a user in closer proximity to the base station can obtain a higher SNIR and a higher MCS level. The transmitter power of a UE under FrPC is expressed as:

$$P_{tx}\{P_{max}, P'_0 + \alpha \cdot \text{PL}\} \text{ and } P'_0 = P_0 + \Delta_0,$$

where $\alpha$ is a multiplier that is less than 1, and $\Delta_0$ is a power increase factor set such that the cell-edge UEs still achieves the target SNIR. (When $\alpha$ is equal to 1, the system operates as a FPC system.) Under FrPC, UEs that are closer to the base station can boost power above the point that would have been set by FPC, where the increase in power $\Delta P$ is given by:

$$\Delta P = (1-\alpha) \times (\text{PL} - \text{PL}_{cell\_edge}),$$

so that $P_{tx} = \Delta P + P_f$,
where $\text{PL}_{cell\_edge}$ is the path loss from the cell edge UE to the base station.

UEs closer to the base station, therefore, have a higher SNIR than UEs farther from the base station. While FrPC shows some improvement over FPC schemes, FrPC chooses UE transmission levels based on a UE path loss and not based on the actual interference level being caused by the UE. Consequently, FrPC power control may not effectively reduce interference in some cases.

What is needed are systems and method of power control for multiple access wireless networks that increase throughput and minimize interference.

SUMMARY OF THE INVENTION

In accordance with an embodiment of the present invention, a method of operating a base station includes determining a first transmit power of a UE, which includes determining a serving base station receive power, determining a path loss of the user equipment (UE) to the base station, determining a downlink signal to noise and interference ratio (SNIR) at the UE, and forming the first UE transmit power. Forming the first UE transmit power comprises summing the serving base station receive power, the path loss of the UE to the base station and the downlink SNIR. The method further includes instructing the UE to transmit at the first UE transmit power.

In accordance with another embodiment of the present invention, a method of operating base station, includes determining a first transmit power of a UE. Determining the transmit power includes determining a serving base station receive power, determining a path loss of the user equipment (UE) to the base station, determining a total mean interference the UE causes to neighboring base stations, determining a power adjustment, and calculating the first UE transmit power. Determining the power adjustment includes subtracting the total mean interference the UE causes to neighboring base stations from the serving base station receive power to form a first difference, where the power adjustment includes the first difference. Calculating the first UE transmit power includes calculating summing the serving base station receive power, the path loss of the UE to the base station and the power adjustment. The method further includes instructing the UE to transmit at the first UE transmit power.

In accordance with yet another embodiment, a wireless base station includes a transmitter and a receiver. The base station is configured to determine a serving base station receive power at the receiver, determine a path loss of a user equipment (UE) to the base station, determine a total mean interference the UE causes to neighboring base stations, determine a first adjustment factor, determine a second adjustment factor, and determine a power adjustment. Determining the power adjustment includes subtracting the total mean interference the UE causes to neighboring base stations from the serving base station receive power to form a first difference, multiplying the first difference with the first adjustment factor to form the power adjustment. The first UE transmit power is calculated by summing the serving base station receive power, the path loss of the UE to the base station, the power adjustment, and the second adjustment factor. The UE is then instructed to transmit at the first UE transmit power via the transmitter.

In accordance with another embodiment, wireless base station includes a transmitter and a receiver. The base station is configured to determine a serving base station receive power at the receiver, determine a path loss of a user equipment (UE) to the base station, determine a downlink SNIR at the UE, determine a first adjustment factor, and determine a second adjustment factor. A first UE transmit power level is calculated by summing the serving base station receive power, the path loss of the UE to the base station, and the downlink SNIR. The UE is then instructed to transmit at the first UE transmit power level via the transmitter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 6 is an embodiment system parameter chart;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely power control in a broadband wireless networks. The invention may also be applied to power control in other types of networks.

In embodiments of the present invention, power control systems and method are implemented that control the uplink transmit power of UEs based on total interference pollution to other cells. The impact of a UE's interference on the throughput of other cells is taken into account when determining UE transmit power. In embodiments, total interference pollution is calculated by summing UE generated interference to every other cell normalized by the expected mean interference level of the cell receiving the interference. This expected mean interference is used as a loading factor for each cell, which is measured and shared with neighboring cells so that the UEs in the neighbor cells can use that as target interference level for that cell.

Figure 1:
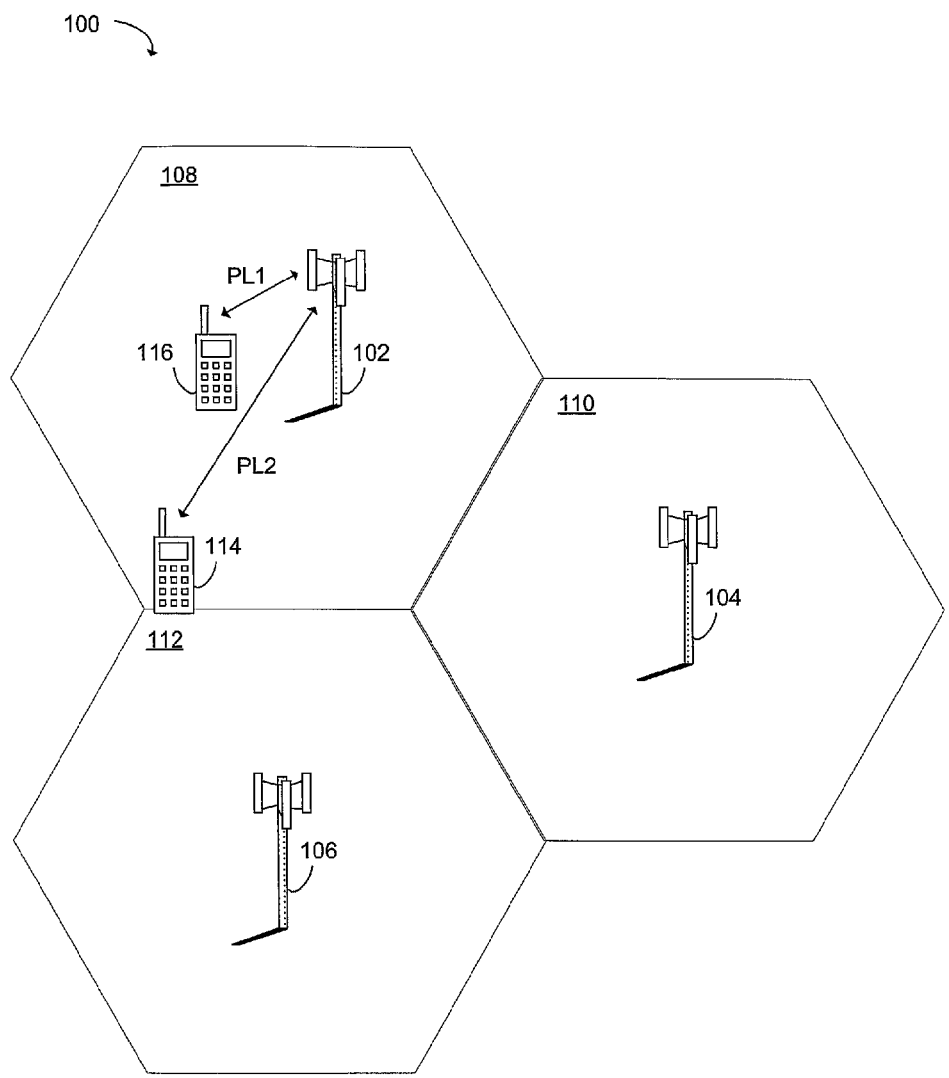
FIG. 1 illustrates a diagram of a conventional mobile broadband system.
Figure 2:
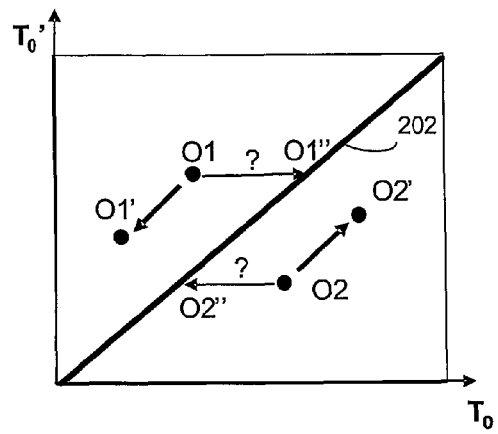
FIG. 2 illustrates a graph showing the relationship between various operating points and an optimal pollution curve.

FIG. 2 illustrates a graph showing the relationship between various operating points with respect to optimal pollution curve 202. In some embodiments, when the power of a UE is increased, assuming a neighbor cell target mean interference threshold of Ti=T0, the resulting interference of each cell would not equal T0 and it would not be a fixed value either. Rather, the resulting interference would be a value that varies in time depending on interference from other cells. Therefore, not all of the base stations will operate in the optimum point according to some embodiments of the present invention. If the realized mean interference received by a base station is larger than the target, $T_0$, an embodiment power adjustment provides a larger power increase than that required to operate in the optimum point. To prevent this from happening, the system increases power some margin $\Delta_2$ below the limit given by the target. Because all UEs are operating using the same algorithm, the actual interference level will also be reduced (point O1 moves to point O1', assuming that the system is not power limited at O1), and the system cannot reach the preferred operating point by changing $\Delta_2$. Similarly, if the actual/experienced total interference level (T0') is smaller than target T0, increasing UE power does not move the operating point close to the optimum pollution curve (point O2 moves to point O2'). In embodiments of the present invention, the power of different UEs are therefore varied by different amounts to achieve operating points close to optimal pollution curve 202. As explained later in this disclosure, this is done in some embodiments using a parameter beta so that different UEs have different adjustments than the target, or by making the $\Delta_2$ value dependent on the UE (UE dependent $\Delta_2$ value). As explained herein, this is done based on the interference measurements performed by neighboring base stations in some embodiments. For example, operating point O1 to shifts to point O1" and operating point O2 to shifts to point O2" by an embodiment method.

In an embodiment used for inter-cell interference coordination (ICIC) for different resource blocks (RBs), different interference target levels are derived for different eNB groups and/or different groups of base stations, which are known apriori by the neighboring cells. The ratio of the target interference level for a specific resource block to the nominal reference target interference level in the system is used to normalize the total interference to these different eNB groups. The interference to other cells is to be measured using downlink measurements if the reciprocity of the channel for medium signal level is valid, or using specific uplink sounding signals.

In embodiments, the UE uplink power is adjusted so as not to exceed a target interference over thermal noise level (TIOT) in an adjacent sector. In some embodiments that account for multiple sectors having multiple target level, for example multi-TIOT ICIC schemes, embodiment power control systems and methods are used to maximize throughput.

Figure 3:
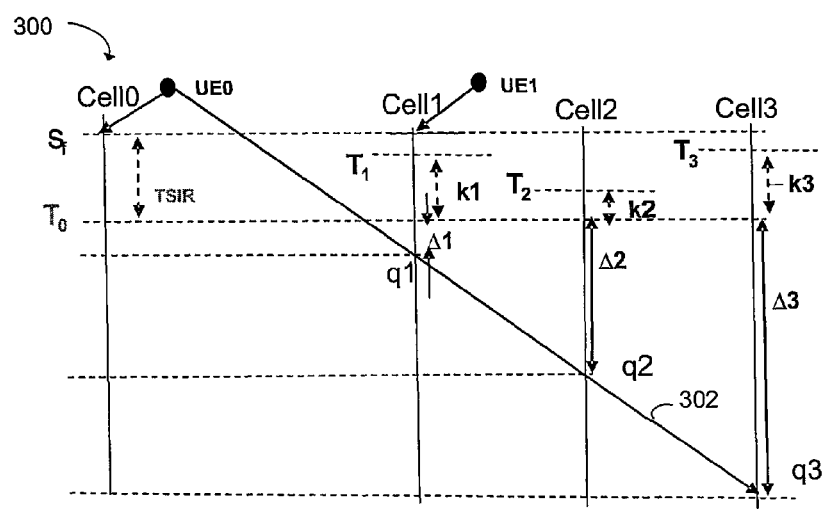
FIG. 3 illustrates a power graph according to an embodiment of the present invention.

FIG. 3 illustrates a power graph 300 according to an embodiment of the present invention. The y-axis of the graph represents transmitted and received power. User equipment UE0 transmits to Cell0 with a path loss of PL0. The signal received by Cell0 is $S_f$. The signal from U0 is also received at neighboring cells Cell1, Cell2 and Cell3 at power levels q1, q2 and q3, respectively, as shown by line 302. Cell0 has an interference target of $T_0$, Cell1, has an interference target of $T_1$, Cell2, has an interference target of $T_2$, and Cell3, has an interference target of $T_3$. In the illustrated embodiment, each interference target represents the amount of total mean interference each cell that achieves a certain level of performance for that cell's UEs. In an embodiment, the interference target can also be the measured instantaneous or mean total interference experienced by each neighbor for that resource block, in which case, this information is shared with the neighboring stations. In the illustrated embodiment, Cell1 receives UE0's signal at a level $\Delta 1+k1$ below the target interference level of $T_1$, Cell2 receives the signal at a level $\Delta 2+k2$ below the target interference level of $T_2$, and Cell3 receives the signal at a level $\Delta 3+k3$ below the target interference level of $T_3$.

It can be seen that the impact of adding an extra interference (q0) to a base station with a higher interference level $T_1$, $T_2$ is smaller than the impact on a base station with a lower interference level. This is because, $10*\log 10((q0+T1)/T1) < 10*\log 10((q0+T2)/T2)$ if $T1>T2$. Therefore, in an embodiment, when determining the total interference pollution level, interference is weighted according to the average/target interference level existed/expected before the addition.

In an embodiment of the present invention, it is assumed that different base stations have different interference tolerance levels, T0 in a given RB, which is decided by each base station or dynamically changed under a radio resource management (RRM) scheme, where other neighboring base stations aware of these thresholds.

In an embodiment the power of the UE is set to be:

$P_f + \Delta P$, where $P_f$ is the FPC transmit level defined in equations (1) and (2) and $\Delta P$ is an offset from the FPC transmit level.

In an embodiment, $\Delta P$ is set to be.

$$\Delta P = \beta \left( S_f - 10\log\left(\sum_i \left(\frac{q_i}{\lambda_i}\right)\right)\right) - \Delta 2,$$

where $q_i$ is the respective interference levels caused by the UE, $\beta$ and $\Delta 2$ are parameters to be found using simulations and depend on the environmental conditions and cell planning; $\lambda_i$ is the ratio between target interference at $i^{th}$ cell and a reference interference level, T0. In an embodiment, if the thermal noise is taken as a reference level, $\lambda_i$ is the target interference power over target thermal power (IOT) of the cell.

A more general expression for $\Delta P$ is:

$\Delta P = f(\delta P)$, where $$\delta P = S_f - 10\log\left(\sum_i \left(\frac{q_i}{\lambda_i}\right)\right).$$

Figure 4:
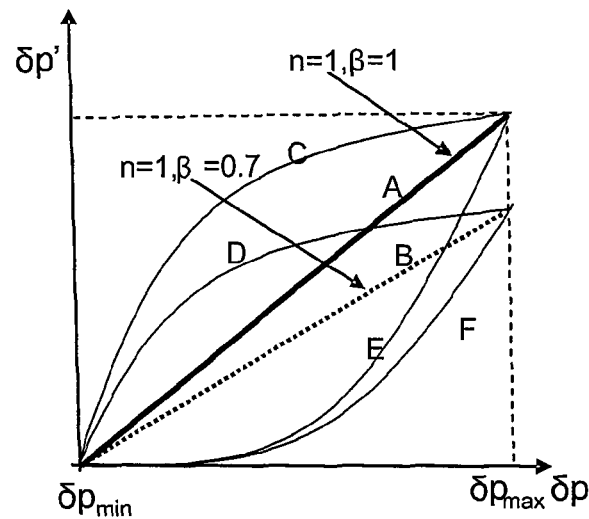
FIG. 4 illustrates embodiment β curves.

In an embodiment, $f$ is a monotonic function chosen to keep UE power levels within a specified range and to achieve a desired tradeoff between cell edge performance and cell center throughput. For example, $f$ can be in the form of $f(x) = \beta x^n$, so that $$\Delta P = \delta P_{min} + \beta \left(\frac{\delta P - \delta P_{min}}{\delta P_{max} - \delta P_{min}}\right)^n,$$

where $\delta P_{min}$ is the minimum value of $\delta P$ over all the UEs in the cell and $\delta P_{max}$ is the maximum value of $\delta P$ over all the UEs in the cell. Examples of various curves for $f(x) = \beta x^n$ is illustrated in FIG. 4. Curve A represents the case where $\beta = 1$ and $n = 1$; curve B represents the case where $\beta = 0.7$ and $n = 1$. Embodiments employing curve B provide power adjustments for higher margin UEs that are linearly reduced according to the path loss. Curves C, D, E and F correspond to embodiments that non-linearly adjust the power using different functions to treat cell centers differently than cell-edge users as shown below. In embodiments, n and $\beta$ are found using simulation and optimization techniques known in the art.

In another embodiment, an adaptive algorithm dynamically adjusts the parameter $\beta$. Neighboring cells inform the base station when the average interference level over a some period exceeds a margin. Depending on the margin, $\beta$ is adjusted to increase or decrease the interference to the neighboring cells. This adjustment may be done to the users which generate high levels of interference to particular neighboring cells.

In an embodiment an adaptive method uses simulations to achieve a specified fairness. A system throughput is measured, and if the local base station fairness is better/worse than a specified fairness, then beta is increased or decreased by a certain amount. The results of the simulation are used to fix a start value, and the adaptive method is used to adjust the simulation dynamically. The amount by which the simulation is adjusted is determined according to simulation techniques known in the art.

In another embodiment, an adaptive method uses simulations that are changed dynamically for a given base station for one value of $\Delta 2$. If a neighboring base station wants to change the operating point by changing its interference, only a $\Delta 2$ value of a UE is changed that interferes with a neighboring base station. If the neighboring base station wants to reduce or increase interference to it, $\Delta 2$ is increased or decreased by a small amount. The amount by which $\Delta 2$ is increased or decreased by a small amount is determined according to simulation techniques known in the art.

In an embodiment, where target interference levels are the same in adjoining cells, $\delta P$ can be simplified as:

$$\delta P = S_f - 10*\log 10(\Sigma(q_i/\lambda_i)) = S_f - 10*\log 10(\Sigma(q_i)) + \Delta 3.$$

Without loss of generality, $\Delta 3$ can be set to be 0. Therefore, $$\Delta P = \beta.(S_f - 10*\log 10(\Sigma(q_i)) - \Delta 2,$$

where $\Sigma(q_i)$ is the total mean interference a UE causes to all the other cells. The above adjustment, $\Delta P$ can be directly estimated from a mean downlink SNIR:

$$SNIR_{DL} = \frac{p_{DL}l_d}{\sum_i p_{DL}l_i + N_0}$$

$$\approx \frac{l_d}{\sum_i l_i}$$

$$= \frac{p_{tx}l_d}{\sum_i p_{tx}l_i}$$

$$\approx \frac{s_f( = UL \text{ received power at serving cell})}{\sum_i q_i( = UL \text{ total interference to neighbours})},$$

where $p_{DL}$ is the downlink transmit power of the base stations, $l_d$ is the downlink path loss from the serving cell $l_i$ is downlink path loss from the ith neighbor base station, and $N_0$ is the thermal noise. Therefore, $\delta P = SNIR_{DL}$ (in dB). When n=1, the power transmitted at the UE is:

$$P_{tx} = P_f + \beta SNIR_{DL} - \Delta 2.$$ This will be referred to an embodiment Geometry Based Power Control (GPC) scheme.

In alternative embodiments, GPC schemes can be modified. For example, in order to increase the cell-edge throughput with minimal impact to overall system throughput, the UE transmit power can be adjusted when $\Delta P$ is positive (i.e. $\delta P = \max(\delta P, 0)$. In an embodiment, the total UE transmit power is determined according to:

$$P_{tx} = P_f + \beta SINR_{DL} - \Delta 2, \beta.SNIR_{DL} \geq \Delta 2$$

$$P_{tx} = P_f, \beta.SNIR_{DL} < \Delta 2.$$

This will be referred to as an embodiment capped Geometry Based Power Control (GPC-Cap) scheme. In a further embodiment, a MTPC-cap scheme can be defined as a method where if the overall power adjustment factor $\Delta P$ is negative, $\Delta P$ is set to zero.

In an embodiment, there are several groups of base stations, each group of which share a common interference threshold level. For a system with three base station groups:

$$\delta P = S_f - 10*\log 10((\Sigma(q_{1j})/\lambda_1) + \Sigma(q_{2j})/\lambda_2) + \Sigma(q_{3j})/\lambda_3)),$$

where $\lambda 1$, $\lambda 2$, and $\lambda 3$ are the relative TIOT levels associated with each BS group, and $(\Sigma(q_{1j})/\lambda_1)$, $(\Sigma(q_{2j})/\lambda_2)$ and $(\Sigma(q_{3j})/\lambda_3)$ represent the impact of the total interference a UE causes to each base station group weighted by their target interference levels. In an embodiment, these interferences can be evaluated using downlink pilot power measurements or special pilot arrangements (e.g. introducing common pilots to each base station group). This will be referred to as an embodiment Multi-Target Power Control (MTPC) scheme.

In an embodiment, at least one of the neighboring base stations adjusts its pilot power level according to a mean interference over threshold level IOT of another one of the neighboring base stations. The expression $$\sum_i \left(\frac{q_i}{\lambda_i}\right)$$

is then evaluated using the downlink SNIR of the pilot signal.

In an embodiment, neighboring base stations use a common pilot signal, and the UE measures a total power of the common pilot signal I, and a desired signal level S from the serving base station. The downlink SNIR is then evaluated according to the expression, $SNIR = S/(I-S)$.

In another embodiment, an iterative scheme is used to follow the interference pollution based scheme in a way that makes less assumptions for all UEs. For example, an optimum power level at which the increase in power of a UE would cause decrease in total throughput is found such that increase in throughput is lower than the decrease of throughput in the other cells. The total throughput of all the cells is determined as:

$$Q = \log_2(1 + p \cdot L_0 / q_0) + \sum_i [\log_2(1 + S_i / (Ti + p \cdot L_i)),$$

where p is the UE uplink transmit power, $L_0$ is the uplink path loss to the serving station, $q_0$ is total interference plus noise received by the serving base station from the UEs in the neighbor base stations, $L_i$ is uplink path loss to the $i^{th}$ neighboring base station $S_i$ is the expected received signal level for a UE served by the $i^{th}$ neighboring station, and $T_i$ is the total interference plus noise power, received by the $i^{th}$ neighboring base station.

Let, $$\frac{\delta Q}{\delta p} = 0 \Longrightarrow \frac{L_0/q_0}{1 + p \cdot L_0/q_0} = \sum_i \frac{1}{1 + \frac{S_i}{Ti + p \cdot L_i}} \cdot \frac{S_i \cdot L_i}{(Ti + p \cdot L_i)^{\wedge}2}.$$

Therefore, $$p(n) = \frac{1}{\sum_i \frac{S_i \cdot L_i}{(Ti + p(n-1) \cdot L_i + S_i) \cdot (Ti + p(n-1) \cdot L_i)}} - \frac{q_0}{L_0}.$$

An iterative scheme is then used to find the optimum power for each UE assuming fixed target Si and known Ti's for all the other cells.

In an embodiment, each UE (or eNB) starts the above iteration with initial value (n=1) of $p(n-1) = p(0) = pf$ (transmit power under full power control). Then, $p(n=2)$ is evaluated. Similarly $p(n)$ is found for larger values of n until the change is small. A fixed target Si and known Ti's are assumed for the other cells.

In an iterative embodiment, a fairness requirement is not considered when the optimum power level is determined through iteration. It considered in the case when throughput gain of the desired cell is greater than the sum of the throughput losses in other cells, or $$\sum_i \log C(i) > 0,$$

where C(i) is the throughput for the UE in cell i. Instead, when a fairness requirement is considered, $$\sum_i w(i) \log C(i) > 0$$

is used for the iterative scheme, where w(i) is a weighting factor for the $i^{th}$ cell.

Figure 5:
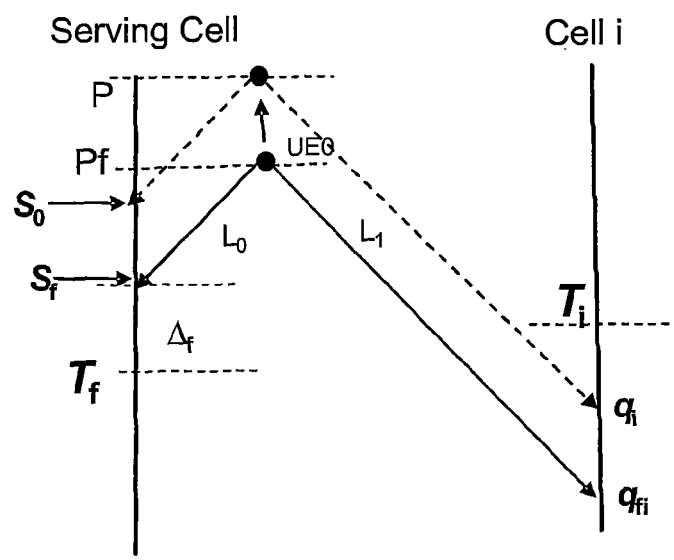
FIG. 5 illustrates an embodiment power graph.

FIG. 5 illustrates a power graph showing the relationship between the transmit power of UE2 with the received power from UE0 at a serving cell and at cell i. Assume at a given UE transmit power level P, the received signals at different BSs are qi, where i=[1 . . . n]. Let S0 represent the serving base station received signal. Ti is the sum of all the other cell interference in cell I (without this test terminal UE0). When P is very large, the interference to other cells are well above the total interference they receive from other UEs. At this point, if the UE power is increased by a small amount, the cost of interference pollution (i.e. throughput loss) from that increase is higher than the corresponding gain (throughput) in the desired cell. In an embodiment, an optimal threshold is found, over which the increase of UE power provides lower performance solution to the system. When p is increased by Δp, assume qi is increased by Δqi, Ti by ΔTi, and Si by ΔSi:

Throughput Gain=$\log_2(1+(S_0+\Delta s)/q_0)-\log_2(1+S/q_0) \approx \log_2((S_0+\Delta S_0)/S_0)$, assuming $S_0 \gg q_0$.

(desired link)=$\log_2(1+\Delta S_0/S_0)=\log_2(1+\Delta P/P)$, where $\{S_0=P/L_0, \Delta S_0=(P+\Delta P)/L_0-P/L_0=\Delta P/L_0\}$.

Throughput Loss =

$$\sum_i [\log_2(1+S_i/T_i) - \log_2(1+S_i/(T_i+\Delta T_i))] \approx \sum_i \log_2((T_i+\Delta T_i)/T_i),$$

assuming $S_i > T_i$.

(other cells) = $\sum_i \log_2(1+\Delta T_i/T_i) = \log_2 \Pi(1+\Delta T_i/T_i) =$ $$\log_2\left(1 + \sum_i (\Delta T_i/T_i) + \sum_{i,j}(\Delta T_i/T_i)\cdot(\Delta T_j/T_j) + \ldots\right) \approx$$

$$\log_2\left[1 + \sum_i (\Delta q_i/T_i)\right].$$

Figure 7:
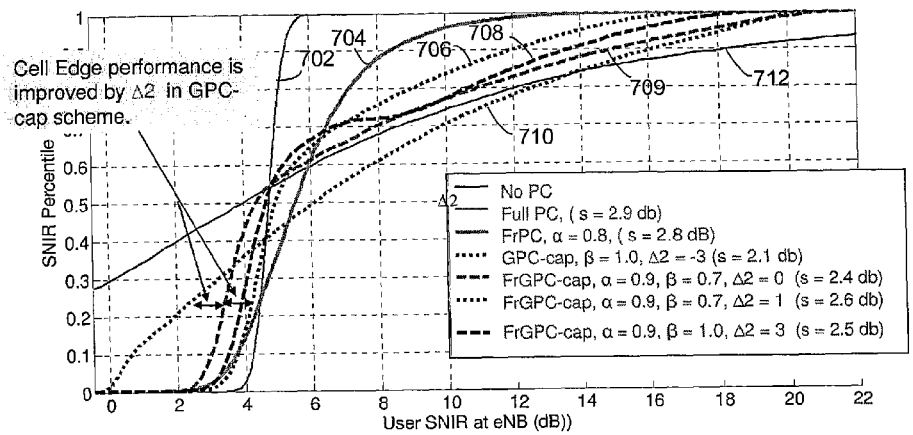
FIG. 7 illustrates an embodiment cumulative distribution function.

FIG. 6 lists the parameters of an example embodiment. FIG. 7 illustrates a cumulative distribution function of SNIR for the case of a Single TIOT under additive white Gaussian noise (AWGN) comparing the performance of various power control schemes according to the system parameters of FIG. 6. Curve 712 represents a system in which no power control is provided; and curve 702 represents a system in which a full power control scheme (FPC) is used. Curve 704 represents a system where fractional power control (FrPC) is used with α=0.8, which results in s=2.8 dB, where s is the standard deviation of IOT variation at the base stations. Curve 710 represents a system in which an embodiment GPC-cap power control method is used with β=1.0 and Δ2=−3, which results in s=2.1 dB. Curve 709 represents a system in which an embodiment FrGPC-cap power control method is used where α=0.9, β=0.7, Δ2=0. FrGPC-cap is a power control scheme in which the GPC-cap power adjustment is implemented on top of FrPC scheme instead of the FPC scheme, which results in s=2.4 dB. Curve 709 represents a system in which an embodiment FrGPC-cap power control method is used where α=0.9, β=0.7, Δ2=0, thereby resulting in s=2.4 dB. Curve 706 represents a system in which an embodiment FrGPC-cap power control method is used where α=0.9, β3=0.7, Δ2=1, thereby resulting in s=2.6 dB). Finally, curve 708 represents a system in which an embodiment FrGPC-cap power control method is used where α=0.9, β=0.7, Δ2=3, resulting in s=2.5 dB. It can be seen that the percent of users having SNIRs less than 3 dB to 4 dB is significantly reduced for the FrGPC-cap method compared to having no power control. The GPC cap (curve 710) and FrGPC-Cap method (curves 706, 708 and 709) has a higher percentage of users having SNIRs greater than 6 dB compared to full power control (curve 702) and fractional power control (curve 704). In summary, embodiment methods allow higher throughput for higher throughput users, as well as allowing for more throughput for low throughput (i.e., cell-edge) users.

Figure 8:
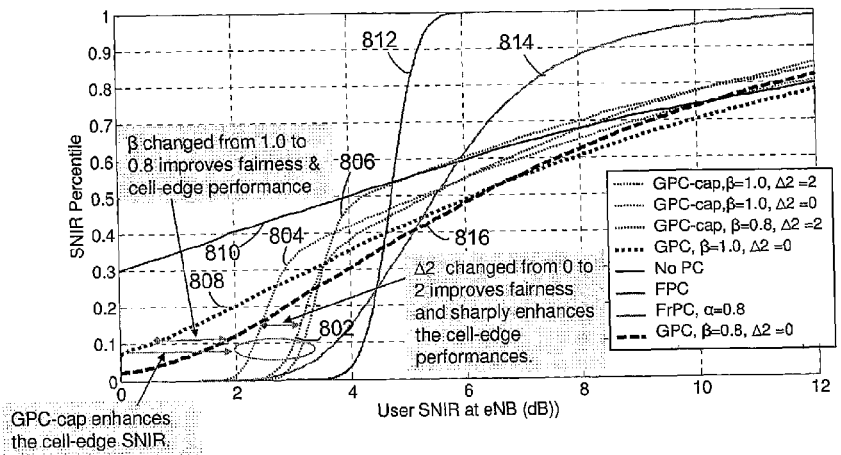
FIG. 8 is a graph illustrating the effect of varying parameters in an embodiment communication system.

FIG. 8 illustrates the effect of varying β and Δ2 on embodiment power control methods for a single TIOT case under AWGN. It can be seen that decreasing β from 1.0 to 0.8 improves fairness and cell-edge performance by lowering the percentage of users with SNIRs of less than 2 dB. (See curves 806 and 816.) It can be further seen that varying Δ2 from 0 to 2 improves fairness and sharply enhances cell edge performance. (See curves 802, 804 and 806.)

Figure 9:
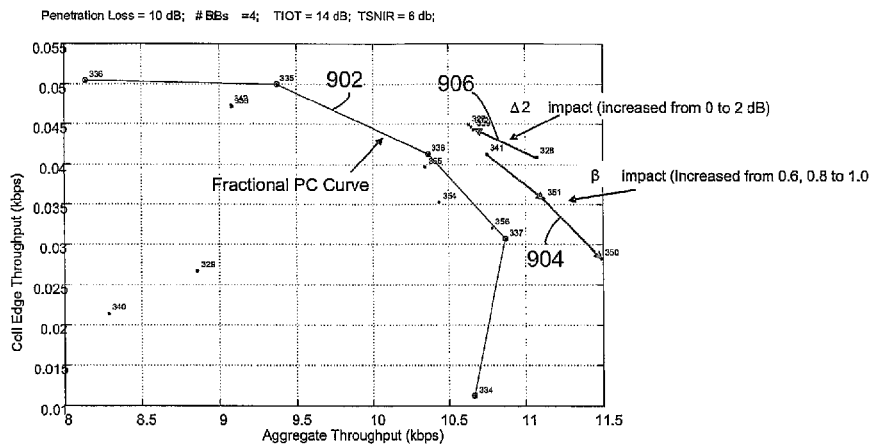
FIGS. 9 and 10 are graphs illustrating the performance of various embodiment power control methods.

FIG. 9 illustrates a comparison of cell-edge throughput v. aggregate throughput for different power control methods for a single TIOT case under AWGN. Curve 902 represents a fractional power control system with different α values; curve 904 represents a GPC-cap system with β varied from 0.6 to 1.0; and curve 906 represents a GPC-cap systems with Δ2 varied form 0 dB to 2 dB.

Figure 10:
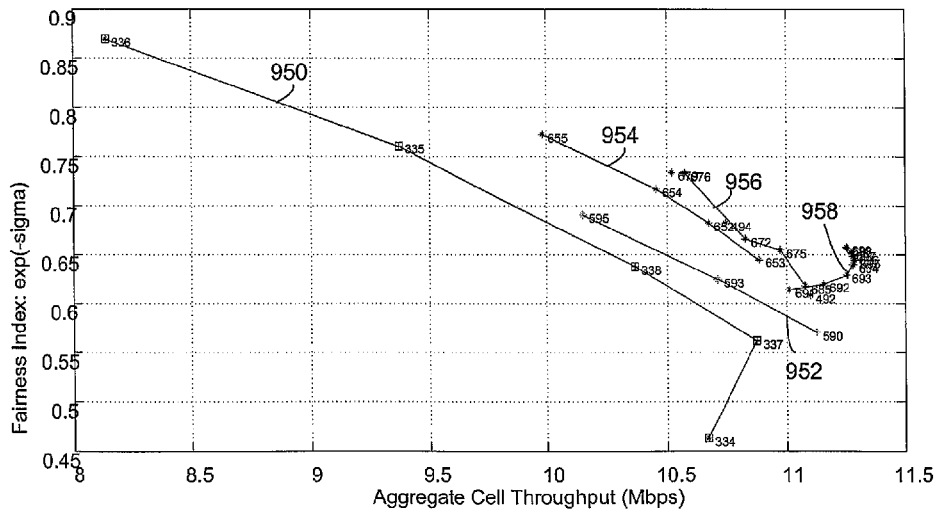

FIG. 10 illustrates a comparison of fairness index v. aggregate cell throughput for different power control methods for multiple target interference over thermal noise level (MULTi-TIOT) cases. The fairness index represents is scaled such that a fairness index of 1 means that all users have the same throughput. Curve 950 represents a fractional power control. Curves 952, 954 and 956 represent GPC power control methods with different intercell interference control (ICIC) scheduling algorithms (single TIOT case), which shows that embodiment schemes provide larger gain when used in combination with different interference control schemes. Curve 958 represents a MTPC power control method applied to a multi-TIOT ICIC scheme. It can be seen that higher average throughputs are achievable using embodiment power control methods.

Figure 11:
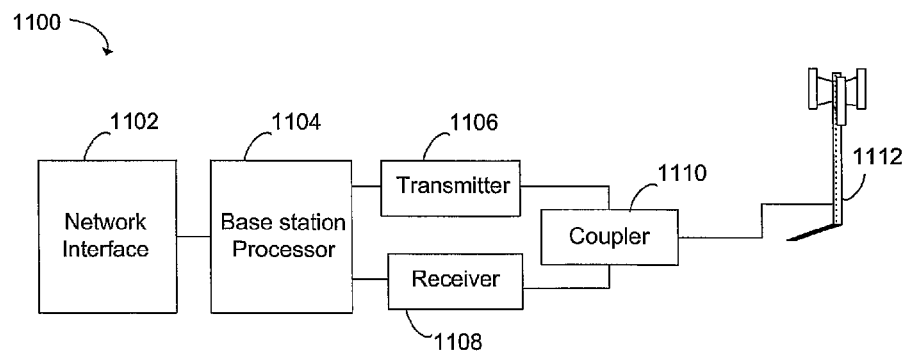
FIG. 11 illustrates a block diagram of an embodiment base station.

A block diagram of an embodiment base station 1100 is illustrated in FIG. 11. Base station 1100 has a base station processor 1104 coupled to transmitter 1106 and receiver 1108, and network interface 1102. Transmitter 1106 and receiver 1108 are coupled to antenna 1112 via coupler 1110. Base station processor 1104 executes embodiment algorithms. In embodiments of the present invention, base station 1100 is configured to operate in a LTE network using an OFDMA downlink channel divided into multiple subbands and using single carrier FDMA in the uplink. In alternative embodiments, other systems, network types and transmission schemes can be used, for example, Wimax, and 1XEV-DO.

Figure 12:
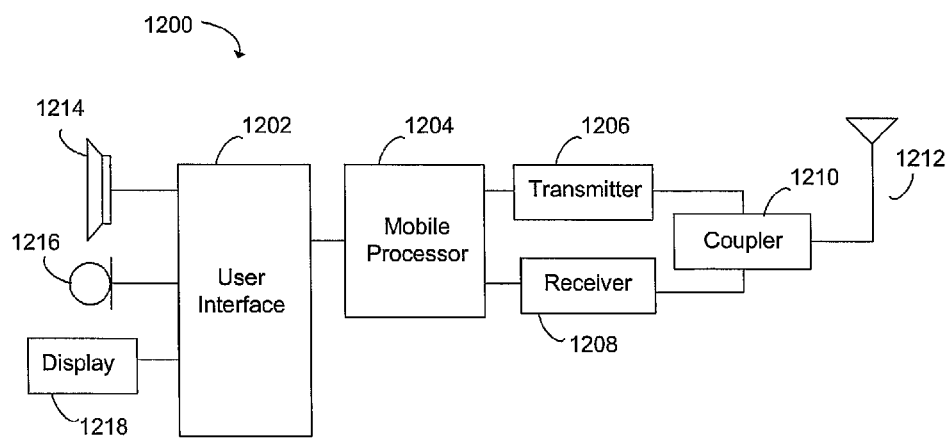
FIG. 12 illustrates a block diagram of an embodiment user device.

A block diagram of an embodiment user device 1200 is illustrated in FIG. 12. User device 1200 can be implemented, for example, as a cellular telephone, or other mobile communication device, such as a computer or network enabled peripheral. Alternatively, user device 1200 can be a non-mobile device, such as a desktop computer with wireless network connectivity. User device 1200 has mobile processor 1204, transmitter 1206 and receiver 1208, which are coupled to antenna 1212 via coupler 1210. User interface 1202 is coupled to mobile processor 1204 and provides interfaces to loudspeaker 1214, microphone 1216 and display 1218, for example. Alternatively, user device 1200 may have a different configuration with respect to user interface 1202, or user interface 1202 may be omitted entirely. In an embodiment, user device 1200 is configured to determine a downlink SNIR by evaluating the expression $$\sum_i \left(\frac{q_i}{\lambda_i}\right).$$

User device 1200 can be further configured to emit a sounding signal.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining, by a power controller in a wireless network, a transmit power level of a user equipment (UE), wherein determining the transmit power level comprises:
   determining a serving base station receive power,
   determining a path loss of the UE to the serving base station,
   determining a downlink signal to noise and interference ratio (SNIR) received by the UE, the downlink SNIR being a ratio of a transmit power of the serving base station received by the UE to noise and interference received by the UE, wherein determining the downlink SNIR received by the UE comprises receiving a measurement of the downlink SNIR from the UE,
   forming a first UE transmit power, wherein forming the first UE transmit power comprises summing the serving base station receive power, the path loss of the UE to the serving base station, and the downlink SNIR; and
   instructing the UE to transmit at the first UE transmit power, wherein the downlink SNIR corresponds to an approximate difference between the power received at the serving base station from the UE and the sum of the interference caused by the UE at neighboring base stations.

2. The method of claim 1, further comprising:
   determining a first adjustment factor, wherein forming the first UE transmit power further comprises multiplying the downlink SNIR with the first adjustment factor.

3. The method of claim 2, wherein forming the first UE transmit power further comprises determining a second adjustment factor.

4. The method of claim 3, further comprising:
   if a product of the downlink SNIR and the first adjustment factor is less than the second adjustment factor,
      forming a second UE transmit power, forming the second UE transmit power comprising summing the serving base station receive power and the path loss of the UE to the serving base station, and
      instructing the UE to transmit at the second UE transmit power.

5. The method of claim 1, wherein neighboring base stations have target mean interference levels that are approximately equal.

6. A method of operating a serving base station, the method comprising:
   determining, by the serving base station, a transmit power level, wherein determining the transmit power level comprises:
   determining a serving base station receive power,
   determining a path loss of a channel extending between a user equipment (UE) and the serving base station,
   determining, by the serving base station, a total interference caused by the UE to neighboring base stations, wherein the total interference is a summation of interference experienced by each of the neighboring base stations as the direct result of uplink transmissions from the UE to the serving base station,
   determining a first adjustment factor,
   determining a second adjustment factor,
   calculating a first UE transmit power in accordance with the total interference caused by the UE to neighboring base stations, wherein calculating the first UE transmit power includes subtracting the total interference caused by the UE to neighboring base stations from the receive power of the serving base station to form a first difference, multiplying the first difference with the first adjustment factor to form a power adjustment, and summing the receive power, the path loss of the UE to the serving base station, the power adjustment, and the second adjustment factor to obtain the first UE transmit power, and
   instructing the UE to transmit at the first UE transmit power.

7. The method of claim 6, further comprising:
   if the power adjustment is less than the second adjustment factor,
      calculating a second UE transmit power, wherein calculating the second UE transmit power comprises summing the serving base station receive power and the path loss of the UE to the serving base station, and
      instructing the UE to transmit at the second UE transmit power.

8. The method of claim 6, wherein determining a total interference caused by the UE to neighboring base stations comprises evaluating the expression $$\sum_i (q_i),$$

wherein $q_i$ comprises an interference level caused by a signal transmitted by the UE at an $i^{th}$ neighboring base station.

9. The method of claim 8, wherein the signal transmitted by the UE comprises a sounding signal.

10. The method of claim 8, further comprising determining $q_i$, determining $q_i$ comprising receiving UE signal information from the UE, the UE signal information comprising strongest signal levels of the signals received from each neighboring base station as measured by the UE.

11. The method of claim 6, wherein determining a total interference caused by the UE to neighboring base stations comprises evaluating the expression, $$\sum_i \left(\frac{q_i}{\lambda_i}\right)$$

wherein $q_i$ comprises an interference level caused by the UE at an $i^{th}$ neighboring base station, and $\lambda_i$ represents a weighting factor applied to $q_i$.

12. The method of claim 11, wherein the weighting factor is determined by a ratio of a target total interference level of the neighboring base stations to a specified mean total interference level of a system.

13. The method of claim 11, further comprising determining $$\frac{q_i}{\lambda_i},$$

determining $$\frac{q_i}{\lambda_i}$$

comprising polling the UE for a received signal strength indication of the $i^{th}$ neighboring base station.

14. The method of claim 13, wherein
the $i^{th}$ neighboring base station has a different pilot sequence from another neighboring base station, and
the received signal strength indication of the $i^{th}$ neighboring base station is determined by the UE based on measuring a received signal amplitude of the different pilot sequence.

15. The method of claim 14, wherein:
at least one of the neighboring base stations adjusts its pilot power level according to a mean interference over threshold level (IOT) of that neighboring base stations; and
the method further comprises evaluating the expression $$\sum_i \left(\frac{q_i}{\lambda_i}\right)$$

further comprises using the downlink SNIR of a pilot signal.

16. The method of claim 15, wherein the neighboring base stations use a common pilot signal, and wherein the method further comprises:
receiving a measurement of a total power of the common pilot signal, I, the UE receives from the serving base station;
determining a desired signal level S from the serving base station; and
evaluating a downlink SNIR according to the expression, SNIR=S/(I−S).

17. The method of claim 6, wherein determining a total interference caused by the UE to neighboring base stations comprises evaluating the expression, $$\sum_i \left(\frac{q_{1i}}{\lambda_1}\right) + \cdots + \sum_j \left(\frac{q_{jn}}{\lambda_n}\right)$$

wherein
$q_{1i}$ comprises an interference level caused by the UE at an $i^{th}$ neighboring base station of a first group of neighboring base stations,
$\lambda_{1i}$ represents a weighting factor proportional to a target received interference level of the first group of neighboring base stations,
$q_{jn}$ comprises an interference level caused by the UE at an $j^{th}$ neighboring base station of an $n^{th}$ group of neighboring base stations,
$\lambda_n$ represents a weighting factor proportional to a target received interference level of the $n^{th}$ group of neighboring base stations.

18. The method of claim 6, wherein determining the first adjustment factor comprises:
using simulations;
using an adaptive method to achieve a specified fairness, wherein using the adaptive method comprises
measuring a system throughput, and
if a local base station fairness is better/worse than a specified fairness, increasing or decreasing beta is by a certain first amount using a step size;
using results of the simulations to fix a start value; and
using the adaptive method to adjust the simulation dynamically.

19. The method of claim 6, wherein determining the second adjustment factor comprises:
using simulations;
changing dynamically for a given base station with one value of Δ2, or
if a neighboring base station wants to change the operating point by changing its interference, change only a Δ2 value of a UE that interferes with a neighboring base station; and
if the neighboring base station wants to reduce or increase interference to it, increasing or decreasing Δ2 by a small amount.

20. The method of claim 6, wherein the total interference excludes interference resulting from uplink transmissions of other UEs.

21. The method of claim 6, wherein the total interference is an approximation of the interference experienced by the neighboring base stations as the direct result of uplink transmissions from the UE to the serving base station.

22. A serving base station comprising:
a transmitter;
a receiver; and
a processor coupled to the transmitter and the receiver, wherein the processor is configured to:
determine a receive power at the receiver;
determine a path loss of a user equipment (UE) to the serving base station;
determine a total interference to neighboring base stations, wherein the total interference is a summation of interference experienced by the neighboring base stations as the direct result of uplink transmissions from the UE to the serving base station;
determine a first adjustment factor;
determine a second adjustment factor;
calculate a first UE transmit power in accordance with the total interference, wherein calculating the first UE transmit power comprises subtracting the total interference from the receive power to form a first difference, multiplying the first difference with the first adjustment factor to form a power adjustment, and summing the receive power, the path loss of the UE to the serving base station, the power adjustment, and the second adjustment factor to obtain the first UE transmit power; and
instruct the UE to transmit at the first UE transmit power via the transmitter.

23. The serving base station of claim 22, wherein the processor is further configured to:
calculate a second UE transmit power, calculating the second UE transmit power comprising summing the path loss of the UE to the serving base station and the receive power level, and
instruct the UE to transmit at the second UE transmit power via the transmitter.

24. The serving base station of claim 22, wherein the processor is further configured to:
determine $$\frac{q_i}{\lambda_i}$$

by polling the UE for a received signal strength indication of the $i^{th}$ neighboring base station, wherein $q_i$ comprises an interference level caused by the UE at an $i^{th}$ neighboring base station, and $\lambda_i$ represents a weighting factor proportional to a target received interference level of the $i^{th}$ neighboring base station; and
evaluate the expression, $$\sum_i \left(\frac{q_i}{\lambda_i}\right)$$

to determine the total interference the UE causes to neighboring base stations.

25. The serving base station of claim 24, wherein the $i^{th}$ neighboring base station is configured to have a different pilot sequence from another neighboring base station, and
wherein the processor is further configured to receive a first received signal strength from the UE, the first signal strength comprising the received signal strength of the $i^{th}$ neighboring base station based on measuring a received signal amplitude of the different pilot sequence as measured by the UE.

26. The serving base station of claim 25, wherein a neighboring base station is configured to change a pilot power value inversely proportional to received total interference from other base stations, and
the downlink SNIR of the pilot is used to represent the expression, $$\sum_i \left(\frac{q_i}{\lambda_i}\right).$$

27. The serving base station of claim 22, wherein the total interference excludes interference resulting from uplink transmissions of other UEs.

28. The serving base station of claim 22, wherein the total interference is an approximation of the interference experienced by the neighboring base stations as the direct result of uplink transmissions from the UE to the serving base station.

29. A serving base station comprising:
a transmitter;
a receiver; and
a processor coupled to the transmitter and the receiver, wherein the processor is configured to:
determine a serving base station receive power at the receiver;
determine a path loss of a user equipment (UE) to the serving base station;
determine a downlink SNIR received by the UE, the downlink SNIR being a ratio of a transmit power of the serving base station received by the UE to noise and interference received by the UE, wherein the downlink SNIR is determined by receiving a measurement of the downlink SNIR from the UE;
calculate a first UE transmit power level, calculating comprising summing the serving base station receive power, the path loss of the UE to the serving base station and the downlink SNIR; and
instruct the UE to transmit at the first UE transmit power level via the transmitter wherein the downlink SNIR corresponds to an approximate difference between the power received at the serving base station from the UE and the sum of the interference caused by the UE at neighboring base stations.

* * * * *